May 31, 1932. S. G. DOWN 1,860,408
COUPLING INTERLOCK
Filed May 5, 1928
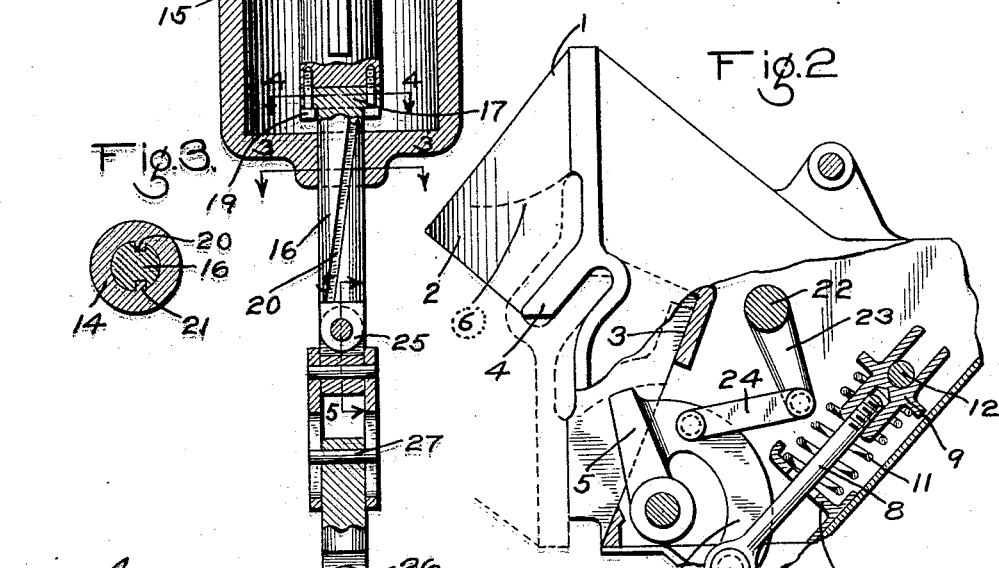
INVENTOR
SIDNEY G. DOWN
BY Wm. M. Cady
ATTORNEY Patented May 31, 1932

1,860,408

UNITED STATES PATENT OFFICE

SIDNEY G. DOWN, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

COUPLING INTERLOCK

Application filed May 5, 1928. Serial No. 275,348.

This invention relates to car and automatic train pipe couplings and has for one of its important objects to provide means for effecting the simultaneous uncoupling of the car couplers and automatic train pipe couplers upon actuation of the coupling locking pins of the car couplers.

While an automatic train pipe coupling will automatically couple with a counterpart coupling when two cars are brought together, it is necessary to manually operate cam levers, when it is desired to uncouple, in order to release the locking of the coupling heads and thus permit the coupling heads to separate when the cars are pulled apart.

Another important object of my invention is, therefore, to provide a simple and effective means for connecting the coupling locking pin of a car coupling with the cam lever of an automatic train pipe coupling, whereby upon movement of the coupling pin to a release position, the cam lever will be moved simultaneously therewith to an unlocked position, said means being so formed as to permit independent movement of the car coupling and train pipe coupling to allow for misalignment and the like.

In the accompanying drawings; Fig. 1 is a side elevation of an automatic train pipe coupling associated with a car coupling and illustrating the application of my invention thereto, parts of the device being shown broken away and in section; Fig. 2 is a fragmentary plan view, partly in section, of the automatic train pipe coupling with my invention incorporated therewith; Fig. 3 is a detail horizontal section taken on the line 3—3 of Fig. 1; Fig. 4 is a detail horizontal section taken on the line 4—4 of Fig. 1; and Fig. 5 is a detail vertical section taken on the line 5—5 of Fig. 1.

The automatic train pipe coupling head 1 comprises a projecting nose 2 adapted to engage in a recess 3 of a counterpart coupling head and hooked portion 4 for interlocking with a corresponding hook portion of a counterpart coupling head. The coupling head 1 is provided with a pivoted cam or latch lever 5 having a cam surface for engaging a curved face 6 of a counterpart coupling head. An inwardly extending curved arm 7 is formed on or carried by the cam lever 5 and has pivotally connected thereto a rod 8. A member 9 is carried by the inner end of the rod 8 and interposed between said member 9 and a fixed abutment 10 is a coil spring 11, which normally functions to hold the cam lever 5 in a locking position. A guide pin 12, secured to the coupling head, is adapted to engage in a slot provided in the member 9 to guide the same in its movement.

The train pipe coupling is disposed below the usual car coupler 13, which in this instance is provided with a depending well or casing 14. The coupling locking pin 15 extends into the well or casing 14, as shown in Fig. 1 of the drawings.

As stated, my invention resides more particularly in means for connecting the coupler locking pin 15 with the cam lever 5 of the train pipe coupling to permit the unlocking of the cam lever with the raising of the coupler locking pin 15 to a release position. This means may comprise a shaft 16 slidably and rotatably mounted in the casing 14 and the upper end of this shaft 16 is provided with a head 17 having semicircular slots 18 formed therein. Headed fastening elements 19 extend through the slots 18 and into the coupler locking pin 15 and form means for connecting the shaft with the locking pin and at the same time allow turning movement of the shaft relative to said pin. Spiral grooves 20 are formed in the shaft and receive tongues 21 formed on the casing 14, so that when the shaft 16 is raised with the pin 15 the same will be turned.

A shaft 22 is rotatably carried by the automatic train pipe coupling and has formed thereon a crank arm 23, which is connected, through the medium of a link 24, with the arm 7 of the cam latch 5. Upon movement of the crank shaft 22 in a counter-clockwise direction, the link 24 will exert a pull on the arm 7 and move the cam latch 5 to its released position against the tension of the coil spring 11.

The grooved shaft 16 and crank shaft 22 are arranged in the same vertical plane and are connected by universal joints 25 and 26. Interposed between the universal joints 25 and 26 is a telescoping section 27 which allows raising and lowering movement of the car coupling and train pipe coupling relative to one another and also vertical movement of the coupling pin relative to the crank shaft 22. The universal joints 25 and 26 allow for angular movement between the car and train pipe coupling.

When it is desired to uncouple a pair of cars equipped with the device, the coupling locking pin 15 is raised through the usual mechanism (not shown), which will lift the shaft 16. This shaft 16, during its raising movement, will be turned through the medium of the spiral grooves 20 and tongues 21. The turning of the shaft 16 is transmitted through the universal joints 25 and 26 and telescopic connection 27, to the crank shaft 22, which in turn will move the cam latch 5 to its release position. Upon release of the locking pin 15 the cam latch 5 will be returned to its normal position by the spring 11.

While one illustrative embodiment of the invention has been described in detail, it is not my intention to limit its scope to that embodied or otherwise than by the terms of the appended claims.

Having now described my invention, what I claim as new and desire to secure by Letters Patent, is:—

1. The combination with a car coupler including a locking pin and an automatic train pipe coupling including a swinging latch cam, of means operatively connecting the locking pin with the cam latch for synchronous unlocking movement including a shaft connected with the locking pin for vertical movement therewith, means for imparting rotary movement to the shaft upon vertical movement thereof, and means for transmitting the rotary movement of the shaft to the swinging cam latch.

2. The combination with a car coupler including a locking pin and an automatic train pipe coupling including a swinging latch cam, of means operatively connecting the locking pin with the cam latch for synchronous unlocking movement including a shaft, means connecting the shaft rotatably with the pin and for vertical sliding movement therewith, means for imparting rotary movement to the shaft upon sliding movement thereof, a crank shaft rotatably carried by the train coupling, a link connecting the crank shaft with the swinging cam latch, and a telescoping and universal joint between the first mentioned shaft and the crank shaft.

3. The combination with a car coupler including a locking pin and an automatic train pipe coupling including a swinging latch cam, of means operatively connecting the locking pin with the cam latch for synchronous unlocking movement including a shaft connected with the locking pin for vertical movement therewith, means for imparting rotary movement to the shaft upon vertical movement thereof, a crank shaft rotatably carried by the train pipe coupling, a link connecting the crank shaft with the swinging cam latch, a pair of spaced universal joints connected respectively to the first mentioned shaft and the crank shaft, and a telescoping connection between said universal joints.

4. The combination with a car coupler having an axially movable coupling pin and a train pipe coupling having a rotatable locking latch, of a shaft operatively connecting said pin with said latch and having means for effecting the rotation of said shaft and said latch upon axial movement of said pin.

5. The combination with a car coupler having an axially movable coupling pin and a train pipe coupling having a rotatable locking latch, of an axially movable shaft operatively connecting said pin with said latch and having means for effecting the rotation of said latch upon axial movement of said pin.

6. The combination with a car coupler having an axially movable coupling pin and a train pipe coupling having a rotatable locking latch, of a shaft mounted for rotatable and axial movement operatively connecting said pin with said latch and having means for effecting the rotation of said latch upon axial movement of said pin.

7. The combination with a car coupler having an axially movable coupling pin and a train pipe coupling having a rotatable locking latch, of a shaft arranged in end-to-end relation to said coupling pin and operatively connecting said pin with said latch and having means for effecting the rotation of said latch upon axial movement of said pin.

In testimony whereof I have hereunto set my hand.

SIDNEY G. DOWN.